US012535936B2

(12) United States Patent
Lee et al.

(10) Patent No.: US 12,535,936 B2
(45) Date of Patent: Jan. 27, 2026

(54) ELECTRONIC DEVICE, METHOD, AND NON-TRANSITORY STORAGE MEDIUM FOR MULTI-PARTY VIDEO CALL

(71) Applicant: Samsung Electronics Co., Ltd., Suwon-si (KR)

(72) Inventors: Bona Lee, Suwon-si (KR); Jiho Kim, Suwon-si (KR); Pilseung Yang, Suwon-si (KR); Kyungwha Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 18/482,581

(22) Filed: Oct. 6, 2023

(65) Prior Publication Data

US 2024/0036705 A1 Feb. 1, 2024

Related U.S. Application Data

(63) Continuation of application No. PCT/KR2022/005033, filed on Apr. 7, 2022.

(30) Foreign Application Priority Data

Apr. 7, 2021 (KR) .......................... 10-2021-0045479

(51) Int. Cl.
*G06F 3/0482* (2013.01)
(52) U.S. Cl.
CPC ................................. *G06F 3/0482* (2013.01)
(58) Field of Classification Search
CPC ................................. G06F 3/0482; H04N 7/15
(Continued)

(56) References Cited

U.S. PATENT DOCUMENTS 5,999,207 A * 12/1999 Rodriguez ............. H04N 7/141
348/E7.078
6,346,962 B1 * 2/2002 Goodridge .............. G06F 3/033
348/E7.083

(Continued)

FOREIGN PATENT DOCUMENTS

EP 4220369 A1 * 8/2023 ............. H04N 7/147
JP 2004-194009 A 7/2004
(Continued)

OTHER PUBLICATIONS

International Search Report dated Jul. 8, 2022, issued in International Application No. PCT/KR2022/005033.

(Continued)

*Primary Examiner* — Justin W Rider
(74) *Attorney, Agent, or Firm* — Jefferson IP Law, LLP

(57) ABSTRACT

An electronic device and a method for a multi-party video call are provided. The electronic device includes a display module, a communication module, and a processor, memory for storing instructions that, when executed by the processor, cause the electronic device to establish communication links with a plurality of users by means of a communication module in order to execute a multi-party video call, display objects representing the plurality of users executing the multi-party video call using a specified first user interface, display one or more selectable options on the first user interface in response to the execution of a specific function during the execution of the multi-party video call, wherein the options are options relating to the specific function, and display the objects, representing the plurality of users, by changing the objects on the basis of a first option selected from among the one or more options by a first user of the electronic device.

15 Claims, 10 Drawing Sheets

(58) Field of Classification Search
USPC .................................................. 348/14, 30
See application file for complete search history.

(56) References Cited

U.S. PATENT DOCUMENTS

| | | | |
|---|---|---|---|
| 6,346,964 B1* | 2/2002 | Rogers | H04N 7/108 |
| | | | 348/14.05 |
| 9,310,970 B2* | 4/2016 | Bansal | G06F 3/0488 |
| 9,942,519 B1 | 4/2018 | Pan et al. | |
| 2006/0156330 A1 | 7/2006 | Chiu | |
| 2008/0229216 A1 | 9/2008 | Bagley et al. | |
| 2011/0249081 A1* | 10/2011 | Kay | H04M 7/003 |
| | | | 348/14.03 |
| 2013/0155169 A1* | 6/2013 | Hoover | H04N 7/157 |
| | | | 348/E7.083 |
| 2015/0301720 A1 | 10/2015 | Gottlieb | |
| 2015/0382135 A1 | 12/2015 | Kawahara et al. | |
| 2016/0072862 A1 | 3/2016 | Bader-Natal et al. | |
| 2017/0371496 A1 | 12/2017 | Denoue et al. | |
| 2018/0351886 A1 | 12/2018 | Gunderson et al. | |
| 2019/0220335 A1 | 7/2019 | Pather et al. | |
| 2020/0092519 A1 | 3/2020 | Shin et al. | |
| 2022/0078374 A1* | 3/2022 | Au | G06F 3/0486 |

FOREIGN PATENT DOCUMENTS

| | | |
|---|---|---|
| KR | 10-2000-0021154 A | 4/2000 |
| KR | 10-0649645 B1 | 11/2006 |
| KR | 10-2016-0001629 A | 1/2016 |
| KR | 10-2020-0057562 A | 5/2020 |

OTHER PUBLICATIONS

Korean Office Action dated Oct. 17, 2025, issued in a Korean Patent Application No. 10-2021-0045479.

* cited by examiner

ELECTRONIC DEVICE, METHOD, AND NON-TRANSITORY STORAGE MEDIUM FOR MULTI-PARTY VIDEO CALL

CROSS-REFERENCE TO RELATED APPLICATION(S)

This application is a continuation application, claiming priority under § 365(c), of an International application No. PCT/KR2022/005033, filed on Apr. 7, 2022, which is based on and claims the benefit of a Korean patent application number 10-2021-0045479, filed on Apr. 7, 2021, in the Korean Intellectual Property Office, the disclosure of which is incorporated by reference herein in its entirety.

BACKGROUND

1. Field

The disclosure relates to an electronic device, method, and non-transitory storage medium for a multi-party video call.

2. Description of Related Art

In recent years, electronic devices have evolved into various forms and are providing various services or functions, for the convenience of users.

Among the various services or functions of electronic devices, there is a technology of performing a video call by taking an image of a user in real time and transmitting it to the other party through a communication network. Along with the advancement of the video call technology, a one-to-one video call has been developed to a multi-party video call with multiple users. This multi-party video call technology has enabled a variety of activities online, which used to be conducted offline, such as video conferencing, video classes, and online gaming.

The above information is presented as background information only to assist with an understanding of the disclosure. No determination has been made, and no assertion is made, as to whether any of the above might be applicable as prior art with regard to the disclosure.

SUMMARY

In a conventional real-time multi-party video call, an electronic device typically provides a uniform layout of thumbnails and supports limited thumbnail ordering functions such as changing the order of who is currently speaking, who has the right to speak, and so on, or making a thumbnail screen visible to the user smaller on the electronic device.

Aspects of the disclosure are to address at least the above-mentioned problems and/or disadvantages and to provide at least the advantages described below. Accordingly, an aspect of the disclosure is to provide an electronic device, method, and non-transitory storage medium for a multi-party video call to more effectively use a user interface related to an executed function according to a situation and a purpose during a multi-party video call.

Additional aspects will be set forth in part in the description which follows and, in part, will be apparent from the description, or may be learned by practice of the presented embodiments.

In accordance with an aspect of the disclosure, an electronic device is provided. The electronic device includes a display module, a communication module, a processor; and the memory for storing instructions that, when executed by the processor, cause the electronic device to: establish communication connections with external electronic devices of a plurality of users by the communication module to execute a multi-party video call, control the display module to display objects representing the plurality of users executing the multi-party video call, using a specified first user interface, control the display module to display one or more selection items selectable in relation to a specific function on the first user interface in response to execution of the specific function during the execution of the multi-party video call, and control the display module to display a second user interface on which the objects representing the plurality of users are changed and displayed based on identifying that a first selection item is selected among the t one or more selection items. The second user interface is different from the first user interface and is represented differently from a user interface displayed on an external electronic device of at least one second user who does not select the first selection item or selects another selection item.

In accordance with another aspect of the disclosure, a method of operating an electronic device is provided. The method includes establishing communication connections with external electronic devices of a plurality of users by a communication module of the electronic device to execute a multi-party video call, displaying objects representing the plurality of users executing the multi-party video call on a display module of the electronic device, using a specified first user interface, displaying one or more selection items selectable in relation to a specific function on the first user interface in response to execution of the specific function during the execution of the multi-party video call, and displaying a second user interface on which the objects representing the plurality of users are changed and displayed based on identifying that a first selection item is selected among the one or more selection items. The second user interface is different from the first user interface and is represented differently from a user interface displayed on an external electronic device of at least one second user who does not select the first selection item or selects another selection item.

In accordance with another aspect of the disclosure, a non-transitory computer-readable storage medium stores one or more programs is provided. The non-transitory computer-readable storage medium includes executable instructions which when executed by a processor of an electronic device, cause the electronic device to establish communication connections with external electronic devices of a plurality of users by a communication module of the electronic device to execute a multi-party video call, display objects representing the plurality of users executing the multi-party video call on a display module of the electronic device, using a specified first user interface, display one or more selection items selectable in relation to a specific function on the first user interface in response to execution of the specific function during the execution of the multi-party video call, and display a second user interface on which the objects representing the plurality of users are changed and displayed based on identifying that a first selection item is selected from among the one or more selection items. The second user interface is different from the first user interface and is represented differently from a user interface displayed on an external electronic device of at least one second user who does not select the first selection item or selects another selection item.

According to an embodiment of the disclosure, a user interface related to an executed function may be more effectively used according to a situation and a purpose during a multi-party video call by providing an electronic device, method, and non-transitory storage medium for a multi-party video call.

Further, the electronic device according to an embodiment of the disclosure may provide various functions in addition to a call through a multi-party video call by configuring and reconfiguring various user interfaces according to a provided authority and function, thereby arousing users' interest.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
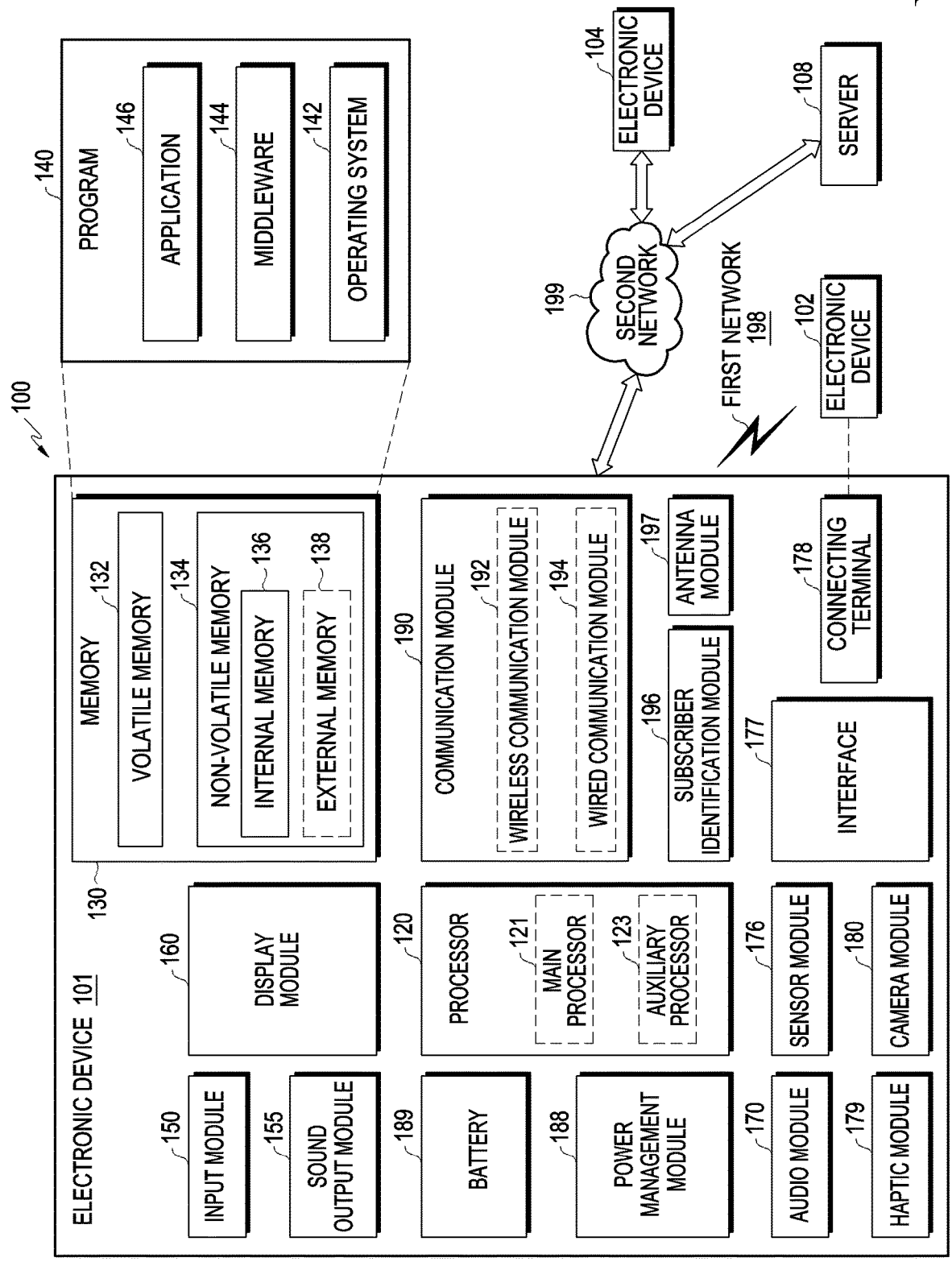
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing 1eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
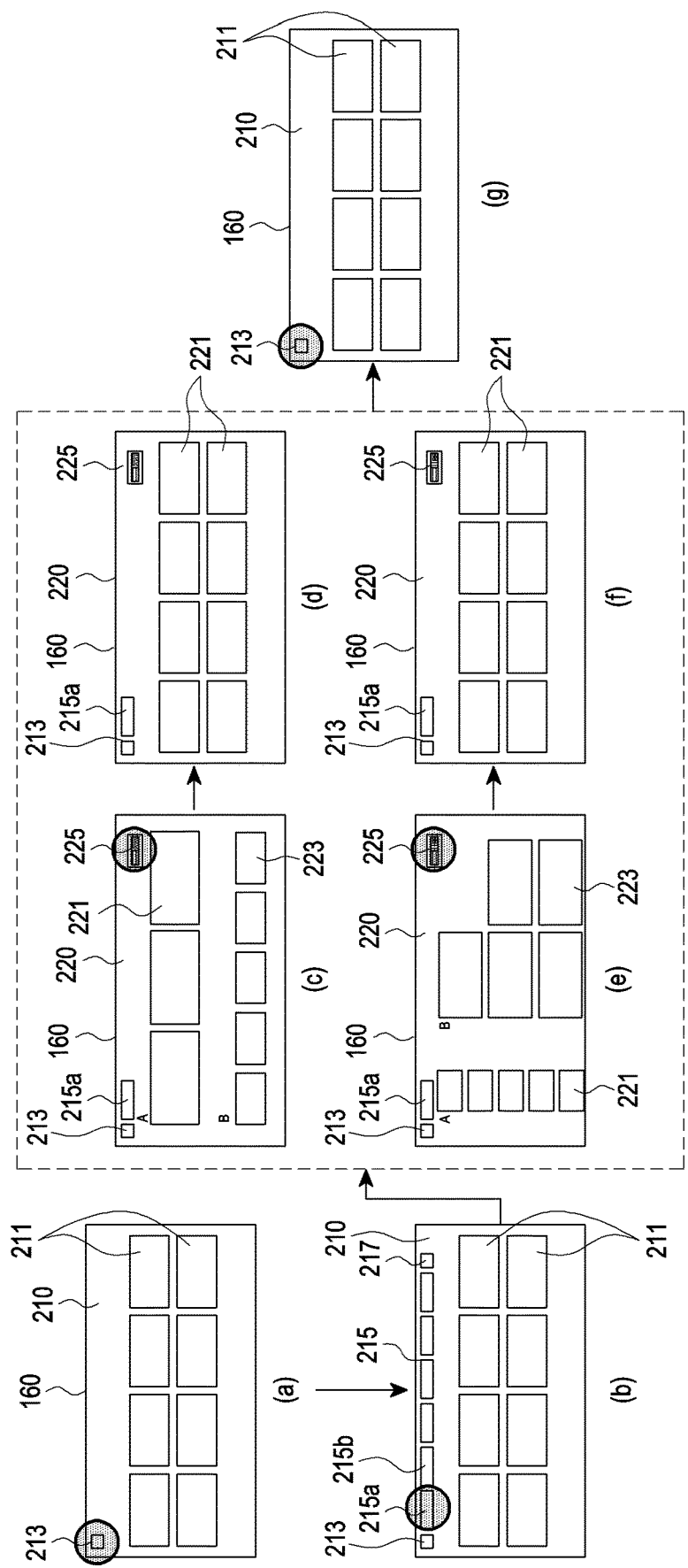
FIG. 2 is a diagram illustrating execution screens displayed on a display module in an electronic device according to an embodiment of the disclosure.

FIG. 2 is a diagram illustrating execution screens displayed on a display module in an electronic device according to an embodiment of the disclosure.

Referring to FIGS. 1 and 2, the electronic device 101 (e.g., the electronic device 101 of FIG. 1) according to an embodiment may be configured to include the memory 130, the display module 160, the communication module 190, and the at least one processor 120 to configure a user interface for displaying objects related to a plurality of users for a multi-party video call according to a situation and a purpose. Without being limited thereto, the electronic device 101 according to an embodiment may be further configured to include other components for displaying objects related to a plurality of users for a multi-party video call according to a situation and a purpose.

The at least one processor 120 according to an embodiment may include a hardware module and/or a software module. The at least one processor 120 may execute instructions stored in the memory 130 to implement the software module and control hardware (e.g., the display module 160, the sensor module 176, or the communication module 190 of FIG. 1) related to a function of the software module. The memory 130 of the electronic device 101 may store instructions to implement a software module illustrated in FIG. 2. At least a part of the software module may be preloaded on the electronic device 101 or downloadable from a server (e.g., the server 108).

According to an embodiment, the at least one processor 120 may execute an application for a multi-party video call and display an execution screen based on a function executed in the executed application.

According to an embodiment, when the application is executed, the at least one processor 120 may control the display module 160 to display a first user interface (or execution screen) 210, as illustrated in part (a) of FIG. 2. The at least one processor 120 may display, on the first user interface 210, objects (e.g., graphical elements, images, videos, or thumbnails) 211 representing a plurality of users participating in a multi-party video call, and a menu (an object, a button, a function, a graphic element, or an image) 213 for activating or deactivating a function list 215 including function menus 215*a* and 215*b* representing functions provided by the application related to the multi-party call. When receiving an input based on selection of the menu 213, the at least one processor 120 may display the function list 215 including the selectable function menus (objects, buttons, functions, graphical elements, or images) 215*a* and 215*b* in a top area of the first user interface 210, as illustrated in part (b) of FIG. 2. The at least one processor 120 may control the display module 160 to display an additional menu 217 for adding a function in an area adjacent to the function list 215 on the first user interface 210, as illustrated in part (b) of FIG. 2. When the menu 213 is selected (tapped) again, the at least one processor 120 may control the activated menu 213 to disappear and control the display module 160 to display the first user interface 210 without the function list 215.

According to an embodiment, the at least one processor 120 may control the communication module 190 to perform the multi-party video call with the plurality of users. During the multi-party video call, the at least one processor 120 may identify users executing a specific one (e.g., a first function 215*a*) of the functions provided by the application among the plurality of users, and group objects the identified users into at least two groups (e.g., a first group A and a second group B) based on information about execution results of the specific function. The at least one processor 120 may configure at least two user interfaces corresponding to the at least two groups, respectively. For example, the at least one processor 120 may group objects representing the users executing the specific one of the functions provided by the application and users executing another function (e.g., a second function 215*b*) among the plurality of users into at least two groups (not shown) during the multi-party video call.

According to an embodiment, when the specific function (hereinafter, described as the first function, by way of example) 215*a* is selected by any one of the users from among the menus included in the function list 215 according to a situation or a purpose, the at least one processor 120 may execute the selected first function 215*a* and control the display module 160 to display one or more selection items selectable in relation to the first function 215*a*. When a user selects a first selection item from among the at least one selection item, the at least one processor 120 may control the display module 160 to display a second user interface displaying objects (e.g., graphical elements, images, videos, or thumbnails) representing a plurality of users based on the first selection item. The first function 215*a* is a function executed in the executed application, and may be a function of collecting an opinion or voting from each of the plurality of users participating in the multi-party video call (e.g., at least one of a voting function, a whisper function, a video class function, a conference function, or a game function).

According to an embodiment, the at least one processor 120 may represent (or generate) a second user interface 220 differently from a user interface displayed on an electronic device of at least one other user (e.g., a second user) who has not selected the first selection item and/or has selected another selection item. The at least one processor 120 may represent (or generate) the second user interface 220 to display at least some or all of the objects representing the plurality of users for the multi-party video call by changing them (e.g., applying a visual graphical effect to the object of at least one of a plurality of rearranged users). According to an embodiment, the at least one processor 120 may group the users who have executed the selected first function 215*a* among the plurality of users into at least two groups (e.g., the first group A and the second group B). For example, the at least one processor 120 may configure a first group including an object representing a first user and an object representing at least one other third user who have selected the first selection item (not shown) of the first function 215*a*, and a second group including an object representing at least one second user who has not selected the first selection item or has selected another selection item, among the plurality of users. The at least two groups may be provided with different execution functions or authorities (e.g., at least one of an authentication authority, an authority to control hardware (H/W) components of another user, such as a microphone/camera, a software (S/W) control authority according to a function (e.g., a control authority related to execution of a chatting or voting function), or a user selection authority) of the executed first function 215*a*. In another example, the at least one processor 120 may distinguish different groups corresponding to different executed functions from each other.

According to an embodiment, the at least one processor 120 may represent (or generate) the second user interface 210 such that different visual graphical effects are applied to the at least two different groups. As illustrated in part (c) of FIG. 2, the at least one processor 120 may represent the second user interface (or execution screen) 220 for the first group A which has selected the first selection item of the first function 215*a*, and control the display module 160 to display the configured second user interface 220. The at least one processor 120 may apply a visual graphical effect to display objects 221 representing users (e.g., the first user and the third user) of the first group A differently from objects 223 representing users (e.g., the second user) of the second group B. For example, the visual graphical effect may include at least one of size adjustment, brightness adjustment, contrast adjustment, transparency adjustment, color display, gradation display, highlight display, or symbol display. For example, when the user (e.g., the first user) of the electronic device 101 is included in the first group, the at least one processor 120 may represent the second user interface 220 such that the size of the objects 221 representing the users of the first group A are larger than that of the objects 223 representing the users of the second group B, as illustrated part (c) of FIG. 2. As illustrated in part (e) of FIG. 2, the second user interface 220 may be displayed on an electronic device of at least one user (e.g., the second user) included in the second group, such that the size of the objects 223 representing the users of the second group B is larger than that of the objects 221 representing the users of the first group A.

In another example, when the user (e.g., the first user) of the electronic device 101 is included in the second group B, the at least one processor 120 may display the objects 223 representing the users of the second group B larger than the objects 221 representing the users of the first group A, as illustrated in part (e) of FIG. 2. As illustrated in part (c) of FIG. 2, the second user interface 220 may be displayed on an electronic device of at least one user (e.g., the second user) included in the second group B such that the objects 221 representing the users of the first group A are displayed larger than the objects 223 representing the users of the second group B. The second user interface 220 as illustrated in part (c) or (e) of FIG. 2 may be displayed equally on the electronic devices of the same group of users who have selected the same selection item of the first function.

According to an embodiment, the at least one processor 120 may display an option menu 225 for returning to the previous first user interface (or layout) 210 in a part of a top area of the second user interface 220, and display the menu 213 and a menu indicating the currently executed function (e.g., the first function 215a) in a part of the top area of the second user interface 220, as illustrated in part (c) or (e) of FIG. 2. For example, the option menu 225 may be configured to be operable only by a master (or host) executing the multi-party call. For example, when the options menu 225 is selected, the at least one processor 120 may display a settings screen providing objects for settings of authorities or functions provided to the user and settings of assigning authorities to other users or controlling operations of other users. In another example, the option menu 225 may be configured to allow the users executing the multi-party call to individually manipulate it.

According to an embodiment, when the option menu 225 is selected on the second user interface 220, the at least one processor 120 may release distinction between the at least two groups and control the display module 160 to display the first user interface 210 on which the objects 211 are displayed equally without distinction, as illustrated part (d) or (f) of FIG. 2. As illustrated part (d) or (f) of FIG. 2, the option menu 225 may remain displayed on the first user interface 210 until before the currently executed function (e.g., the first function 215a) is completed or another function (e.g., the second function 215b) is executed. When the currently executed function (e.g., the first function 215a) is completed or another function (e.g., the second function 215b) is executed, the at least one processor 120 may control the display module 160 to return to the first user interface 210 and display the first user interface 210 without the option menu 225, as illustrated part (g) of FIG. 2.

According to an embodiment, the at least one processor 120 may obtain information about execution results of the function being executed (e.g., the first function 215a) based on information about a selection item selected by each of the plurality of users, and display the information about the execution results on the second user interface 220. According to an embodiment, the at least one processor 120 may control the communication module 190 to transmit the information about the execution results to an external electronic device. According to an embodiment, the at least one processor 120 may represent the second user interface 220 by replacing the objects representing the plurality of users with respective designated character images so that the actual faces of the plurality of users are not exposed.

While main components of an electronic device have been described in the context of the electronic device 101 of FIG. 1 in an embodiment, all of the components illustrated in FIG. 1 are not compulsory, and the electronic device 101 may be implemented with more or fewer components than those illustrated in various embodiments. Further, the positions of the major components of the electronic device 101 described with reference to FIG. 1 may vary according to various embodiments.

According to an embodiment, an electronic device (e.g., the electronic device 101 of FIG. 1) may include a display module (e.g., the display module 160 of FIGS. 1 and 2), a communication module (e.g., the communication module 190 of FIG. 1), a processor (e.g., the processor 120 of FIG. 1); and memory (e.g., the memory 130 of FIG. 1) for storing instructions that, when executed by the processor, cause the electronic device to: establish communication connections with external electronic devices of a plurality of users by the communication module to execute a multi-party video call, control the display module to display objects representing the plurality of users executing the multi-party video call, using a specified first user interface, control the display module to display one or more selection items selectable in relation to a specific function on the first user interface in response to execution of the specific function during the execution of the multi-party video call, and control the display module to display a second user interface on which the objects representing the plurality of users are changed and displayed based on identifying that a first selection item is selected from among the one or more selection items. The second user interface may be different from the first user interface and represented differently from a user interface displayed on an external electronic device of at least one second user who does not select the first selection item or selects another selection item.

According to an embodiment, the specific function may be included in a function list displayed on the first user interface, and may be a function of collecting an opinion or voting from each of the plurality of users.

According to an embodiment, the instructions, when executed by the processor, cause the electronic device to may be configured to set a first group including the first user and at least one other third user selecting the first selection item among the plurality of users, set a second group including the at least one second user who does not select the first selection item or selects another selection item, and control the display module to display the second user interface by applying different visual graphical effects to the first group and the second group. The visual graphical effects may include at least one of size adjustment, brightness adjustment, contrast adjustment, transparency adjustment, color display, gradation display, highlight display, or symbol display.

According to an embodiment, the a processor may be configured to control the display module to display objects of the first user and the at least one other third user included in the first group as large-sized images on the second user interface, and control the display module to display an object of the at least one second user included in the second group as a small-sized image on the second user interface.

According to an embodiment, the a processor may be configured to, when the first user is a master user proposing the specific function, provide at least one of an authentication authority, an authority to control a microphone or a camera of another user, a control authority related to execution of the specific function, or a user selection authority, and control the display module to display an object representing at least some of the plurality of users on the second user interface by applying a different visual graphical effect to the object according to the provided authority.

According to an embodiment, the a processor may be configured to obtain execution result information about the specific function based on information about a selection item selected by each of the plurality of users, control the display module to display the execution result information on the second user interface, and control the communication module to transmit the execution result information to external electronic devices.

According to an embodiment, the a processor may be configured to identify at least one user corresponding to a speaker among the plurality of users during the execution of the multi-party video call, and configure the second user interface to apply a visual graphic effect of highlighting an object representing the identified at least one user.

According to an embodiment, the a processor may be configured to control the display module to display, on the first user interface, at least one of a menu for activating or deactivating a function list including functions provided by an application executing the multi-party video call or a menu for adding a function.

According to an embodiment, the a processor may be configured to control the display module to display a specified character image in place of each of the objects representing the plurality of users on the second user interface to prevent actual faces of the plurality of users from being exposed.

With reference to the following drawings, an operation method of an electronic device according to various embodiments described in FIG. 1 will be described below.

Figure 3:
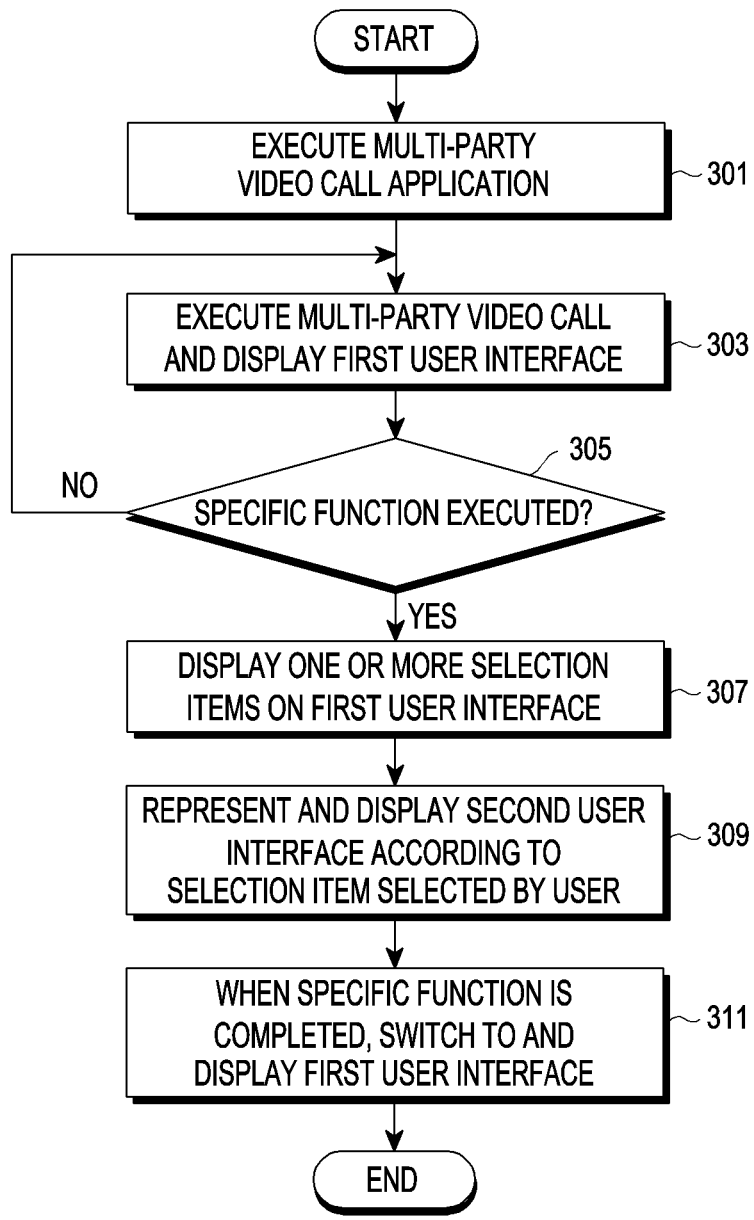
FIG. 3 is a diagram illustrating an operation method in an electronic device according to an embodiment of the disclosure.

FIG. 3 is a diagram illustrating an operation method of an electronic device according to an embodiment of the disclosure.

Referring to FIG. 3, an electronic device (e.g., electronic device 101 of FIG. 1) according to an embodiment may execute an application for executing a multi-party video call and establish communication connections with external electronic devices of a plurality of users participating in the multi-party video call by a communication module (e.g., the communication module 190 of FIG. 1) in operation 301. When the application is executed, the electronic device may establish the communication connection for the multi-party call in response to an input of selecting an object (button or menu) representing call joining displayed on a screen (or user interface) for executing the multi-party video call.

In operation 303, the electronic device may complete the communication connection for the multi-party video call and thus execute the multi-party video call. Once the communication connection for the multi-party video call is established, the electronic device may display an initially configured first user interface (or execution screen) for the video call on a display module (e.g., the display module 160 of FIG. 1). The electronic device may display objects (e.g., graphical elements, still images, thumbnails, or videos) representing a plurality of users participating in the multi-party video call in a predetermined display format on the first user interface. The electronic device may display, on the first user interface, a menu for activating or deactivating a function list or the function list (e.g., the function list 215 of FIG. 2) including menus (e.g., the function menus 215a and 215b) representing functions provided by the application.

In operation 305, the electronic device may identify whether a specific function (e.g., the first function 215a of FIG. 2) is executed during the multi-party video call. When the specific function is executed as a result of the identification, operation 307 may be performed, and otherwise, operation 303 may be performed to continue the video call. The specific function, which is a function executed in the executed application, may be a function of collecting an opinion or voting from each of the plurality of users in the multi-party video call (e.g., at least one of a voting function, a whisper function, a video class function, a conference function, or a game function).

In operation 307, when the specific function is executed, the electronic device may display at least one selectable selection item in relation to the specific function on the first user interface.

In operation 309, the electronic device may identify that a user (e.g., a first user) has selected a first selection item from among the one or more selection items, and display a second user interface displaying objects (e.g., graphical elements, images, videos, or thumbnails) representing a plurality of users based on the first selection item. The second user interface may be represented differently from a user interface displayed on an external electronic device of at least one second user who has not selected the first selection item and/or has selected another selection item.

When displaying the second user interface in operation 309, the electronic device may group the users who have executed the selected specific function among the plurality of users into at least two groups (e.g., a first group A and a second group B). For example, the at least one processor 120 may configure a first group including an object representing the first user and an object representing at least one other third user who have selected the first selection item (not shown) of the specific function, and a second group including an object representing at least one second user who has not selected the first selection item and/or has selected another selection item among the plurality of users. The electronic device may represent a new second user interface (or execution screen) on which different visual graphical effects are applied to the at least two distinct groups. The electronic device may display objects (e.g., still images, thumbnails, or graphical elements) representing users, which reflect information about execution results of the function, by group on the second user interface. For example, the visual graphical effects may include at least one of size adjustment, brightness adjustment, contrast adjustment, transparency adjustment, color display, gradation display, highlight display, or symbol display.

In operation 311, the electronic device may discontinue displaying the second user interface and switch to the first user interface based on completion of the execution of the specific function or execution of another function.

According to an embodiment, when performing operation 309 of FIG. 3, the electronic device may group objects representing other users who have not executed the specific function (e.g., the first function) among the plurality of users participating in the multi-party video call into a separate group, and configure a third user interface different from the second user interface or display objects corresponding to the separate group distinguishably by a different visual graphical effect on the second user interface.

According to an embodiment, when the user is a master user (or host) for the specific function, the electronic device may change at least some authorities of the specific function for the users who have executed the specific function, and transmit information about the changed authorities to external electronic device of the users who have executed the specific function.

According to an embodiment, when performing operation 309 of FIG. 3, the electronic device may identify, among the plurality of users participating in the multi-party video call, other users executing a function different from the specific function (e.g., the first function) and distinguish at least two other groups based on a selection item of the second function selected by the user. For example, when the first function and the second function are executed simultaneously, the electronic device may represent different second user interface by applying different graphical effects to the groups distinguished based on a selection item of the first function selected by the user and the groups distinguished based on a selection item of the second function selected by the user. In another example, the electronic device may represent a second user interface by applying different visual graphical effects to the groups distinguished by the selection item of the first function selected by the user, and a third user interface by applying different visual graphical effects to the groups distinguished by the selection item of the second function selected by the user. The electronic device may display thumbnails or selectable menus (or buttons) corresponding to the third user interface configured in a state in which the second user interface is displayed, in a partial area of the display module. When a thumbnail or selectable menu (or button) is selected, the electronic device may remove the second user interface and display it as a thumbnail or selectable menu (or button), while displaying the third user interface on the display module.

Figure 4:
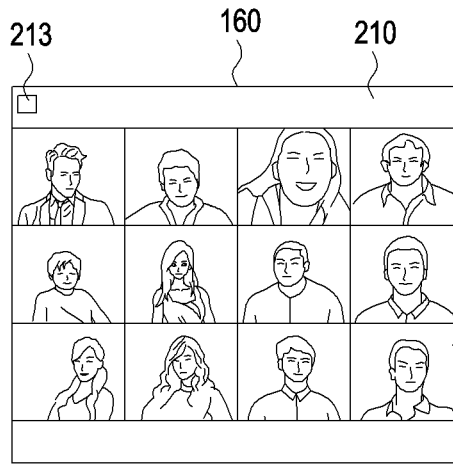
FIG. 4 is a diagram illustrating execution screens displayed on a display module in an electronic device according to an embodiment of the disclosure.
Figure 4:
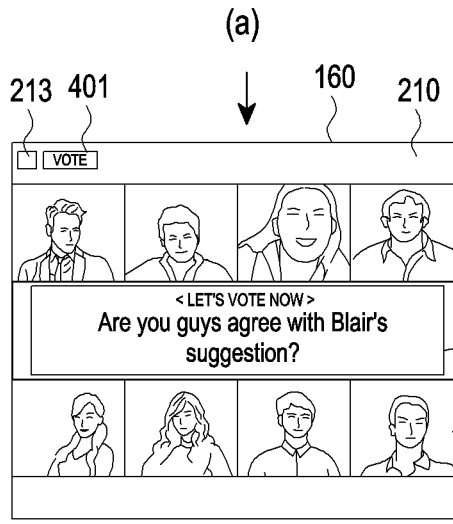
Figure 4:
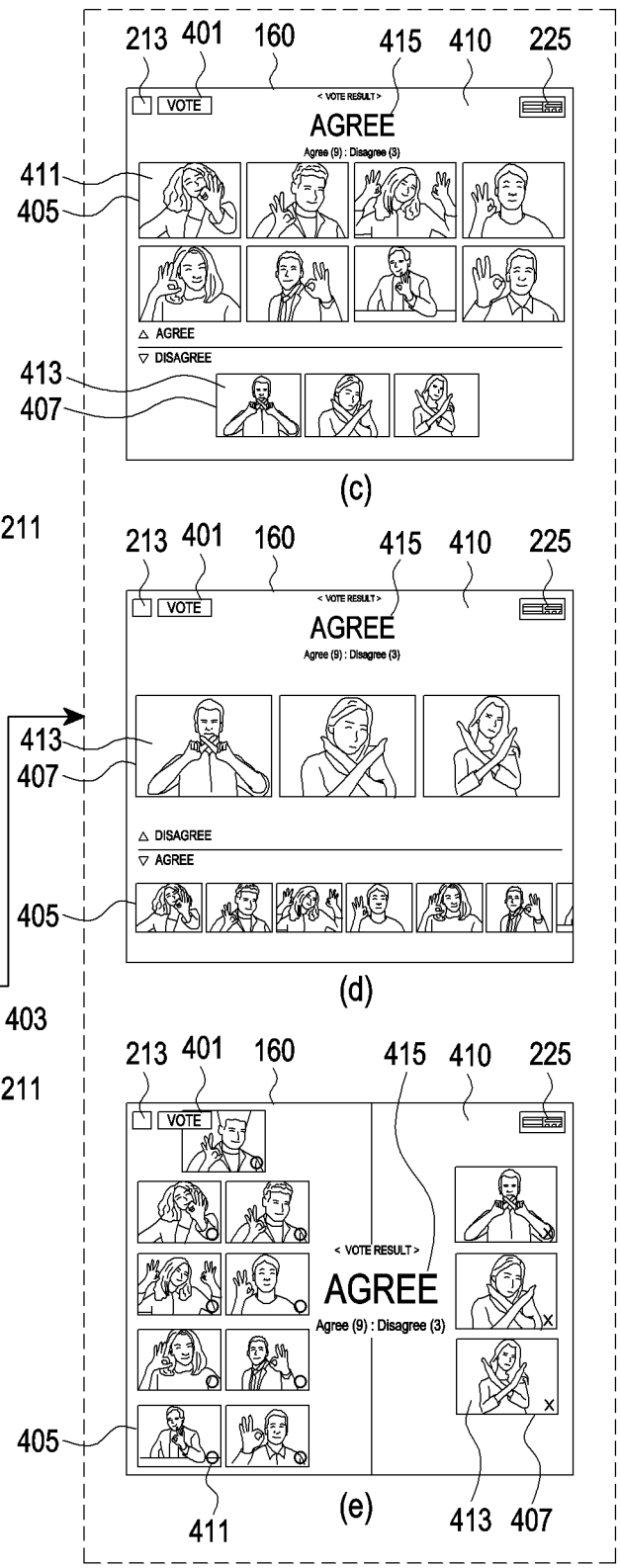

FIG. 4 is a diagram illustrating execution screens displayed on a display module in an electronic device according to an embodiment of the disclosure.

Figure 5:
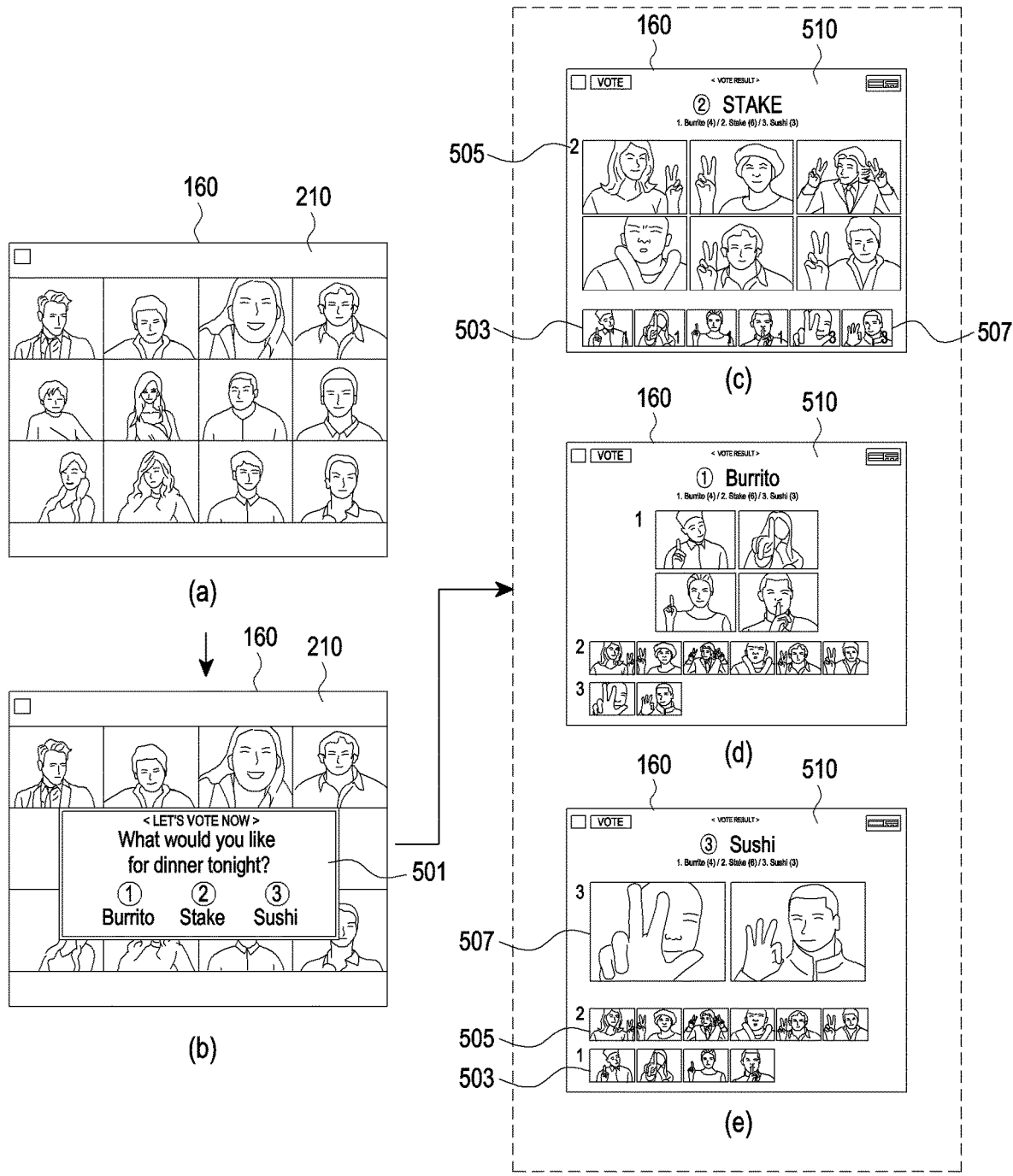
FIG. 5 is a diagram illustrating execution screens displayed on a display module in an electronic device according to an embodiment of the disclosure.

FIG. 5 is a diagram illustrating execution screens displayed on a display module in an electronic device according to an embodiment of the disclosure.

Referring to FIG. 4, an electronic device (e.g., the electronic device 101 of FIG. 1) according to an embodiment may display the first user interface (or execution screen) 210 on the display module 160 during a multi-party video call, as illustrated in part (a) of FIG. 4 and part (a) of FIG. 5. The electronic device may display the objects (graphical elements, still images, thumbnails, or videos) 211 representing a plurality of users participating in the multi-party video call on the first user interface 210. The electronic device may display the menu (object, button, function, graphical element, or image) 213 for activating or deactivating a function list (e.g., the function list 215 of FIG. 2) representing functions provided by an application related to the multi-party call. When receiving an input based on selection of the menu 213, the at least one processor 120 may display a function list including selectable function menus (objects, buttons, functions, graphical elements, or images) in a top area of the first user interface 210. The electronic device may control the display module 160 to display an additional menu for adding a function in an area adjacent to the function list on the first user interface 210. When the menu 213 is selected (tapped) again, the electronic device may control the menu 213 to disappear and control the display module 160 to display the first user interface 210 without the function list.

According to an embodiment, the electronic device may identify users executing a specific function (hereinafter, described in the context of a voting function 401 among the functions provided by the application, by way of example) among the plurality of users and transmit a message including information 403 related to voting to external electronic devices of the users executing the voting function 401 during the multi-party video call, as illustrated in part (b) of FIG. 4. The electronic devices may display the information 403 related to the voting on the first user interface 210.

According to an embodiment, when receiving voting result information according to the information 403 related to the voting from the users participating in the voting function, the electronic device may group the users executing the voting function 401 into at least two groups based on the voting result information. For example, the electronic device may configure a first group 405 including objects representing users who agree with the voting content 403 and a second group 407 including objects representing users who disagree with the voting content 403 based on the voting result information. The electronic device may identify users who have not executed the voting function 401 among the plurality of users participating in the multi-party video call or group the users who have not executed the voting function 401 into a third group. For example, the electronic device may configure a second user interface 410 by applying a different visual graphical effect to objects 411 representing the users included in the first group 405 from that of objects 413 representing the users included in the second group 407, and display the configured second user interface 410 on the display module 160, as illustrated in part (c) of FIG. 4. For example, the electronic device may provide different execution functions or different authorities (e.g., at least one of an authentication authority, an authority to control H/W components such as a microphone/a camera, or a S/W authority (e.g., chatting or voting)) by group (e.g., a first group 405, a second group 407, or a third group (not shown)) according to information about execution results of the voting function 401. For example, when a user of the electronic device is a proposer of the voting function 401, the electronic device may configure the second user interface 410 including a separate menu for controlling each group and exerting authorization for each group. When the user of the electronic device is not a proposer, the second user interface 410 may not include the separate menu. For example, when the user of the electronic device is the proposer of the voting function, the electronic device may analyze and store the voting result information received from other users participating in the voting, and transmit at least one of the voting result information, analysis information, group information, or settings information about the second user interface to electronic devices of the other users participating in the voting.

According to an embodiment, the electronic device may display any one of different second user interfaces 410 with different visual graphic effects for the different groups on the display module 160 based on the voting result information about the user, as illustrated in part (c) or (d) of FIG. 4. At least one visual graphical effect may include at least one of size adjustment, brightness adjustment, contrast adjustment, transparency adjustment, color display, gradient display, highlight display, or symbol display. For example, when the voting result information about the user is agreement, the electronic device may configure the second user interface 410 to display the objects 411 included in the first group 405 in a larger image size than the objects 413 included in the second group 407, as illustrated in part (c) of FIG. 4. In another example, when the user disagrees with the voting content, the electronic device may configure the second user interface 410 to display the objects 413 included in the second group 407 in a larger image size than the objects 411 included in the first group 405, as illustrated in part (d) of FIG. 4. In another example, when the user did not participate in the voting, the electronic device may configure the second user interface 410 to display the first group 405 and the second group 407 distinguishably by applying different visual graphic effects based on the voting result information, as illustrated in part (e) of FIG. 4. For example, the electronic device may configure the second user interface 410 to display notification information 415 indicating the voting results or analysis result of the users who participated in the voting, as illustrated in parts (c), (d), and (e) of FIG. 4.

When the voting function 401 is executed for information 501 related to other voting content during the multi-party video call, the electronic device according to an embodiment may receive voting result information including voting results from electronic devices of users participating in the voting, and analyze and store the received voting result information, as illustrated in FIG. 5. The electronic device may group the users into different groups (e.g., a first group 503, a second group 505, a third group 507, or a fourth group (not shown)) and configure a second user interface 510 on which a different visual graphical effect is applied to each group. For example, the groups may be configured in correspondence to the number (e.g., three) of selection items provided by the information 501 related to the electronic device voting content. In another example, as many groups as the number (e.g., three) of selection items provided by the information 501 related to the electronic device voting content may be configured, and a group of users who have not participated in the voting may be added. For example, the electronic device may configure second user interfaces 510 with different visual graphic effects for the respective groups, and display a second user interface with a visual graphic effect corresponding to a group including an object representing the user on the display module 160, as illustrated in parts (c), (d), and (e) of FIG. 5. In another example, when any one of the groups (e.g., the second group 505 or the third group 507) other than the group including users who have selected the same selection item as the user is selected, the electronic device may change the way how the objects of the users included in the selected group are displayed (e.g., increase the size of the objects, highlight the objects, or move the objects to a main display area). In another example, when the user of the electronic device has not participated in the voting, the electronic device may configure a user interface (not shown) visible to the user who has not participated in the voting by applying a different visual graphic effect from that of the second user interface 510, and display the configured user interface (not shown) on the display module.

Figure 6:
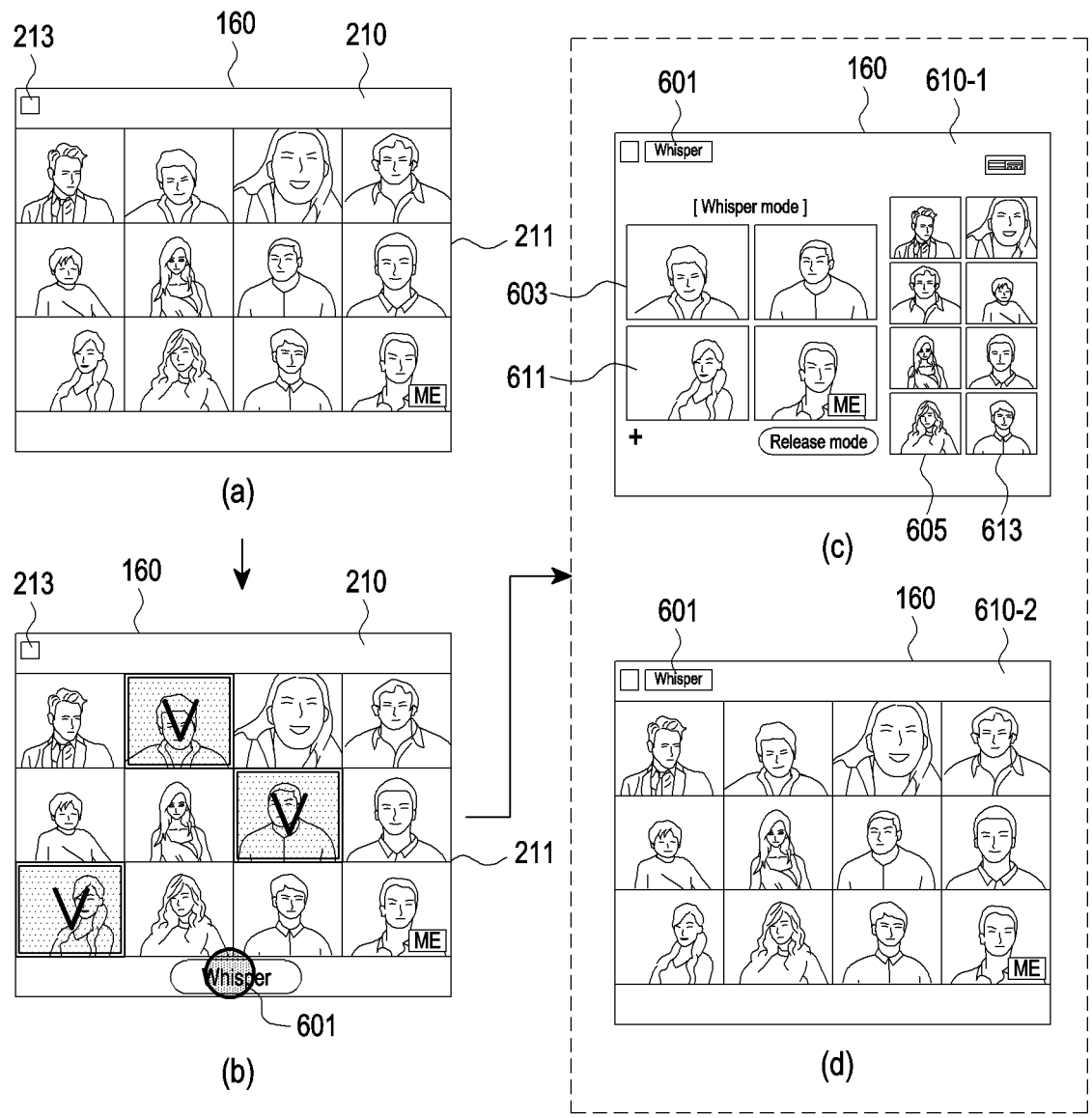
FIG. 6 is a diagram illustrating execution screens displayed on a display module in an electronic device according to an embodiment of the disclosure.

FIG. 6 is a diagram illustrating execution screens displayed on a display module in an electronic device according to an embodiment of the disclosure.

Figure 7:
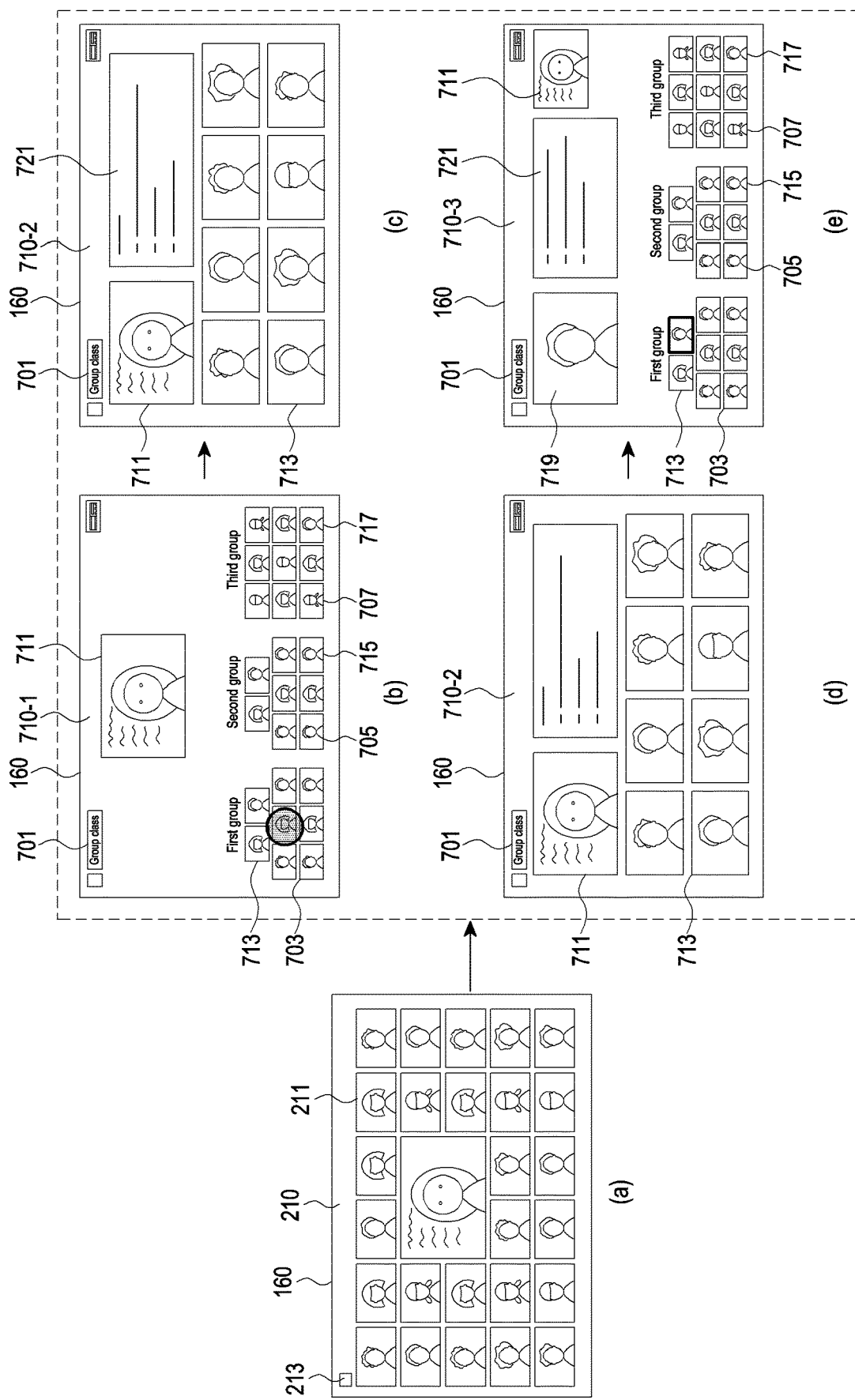
FIG. 7 is a diagram illustrating execution screens displayed on a display module in an electronic device according to an embodiment of the disclosure.

FIG. 7 is a diagram illustrating execution screens displayed on a display module in an electronic device according to an embodiment of the disclosure.

Figure 8:
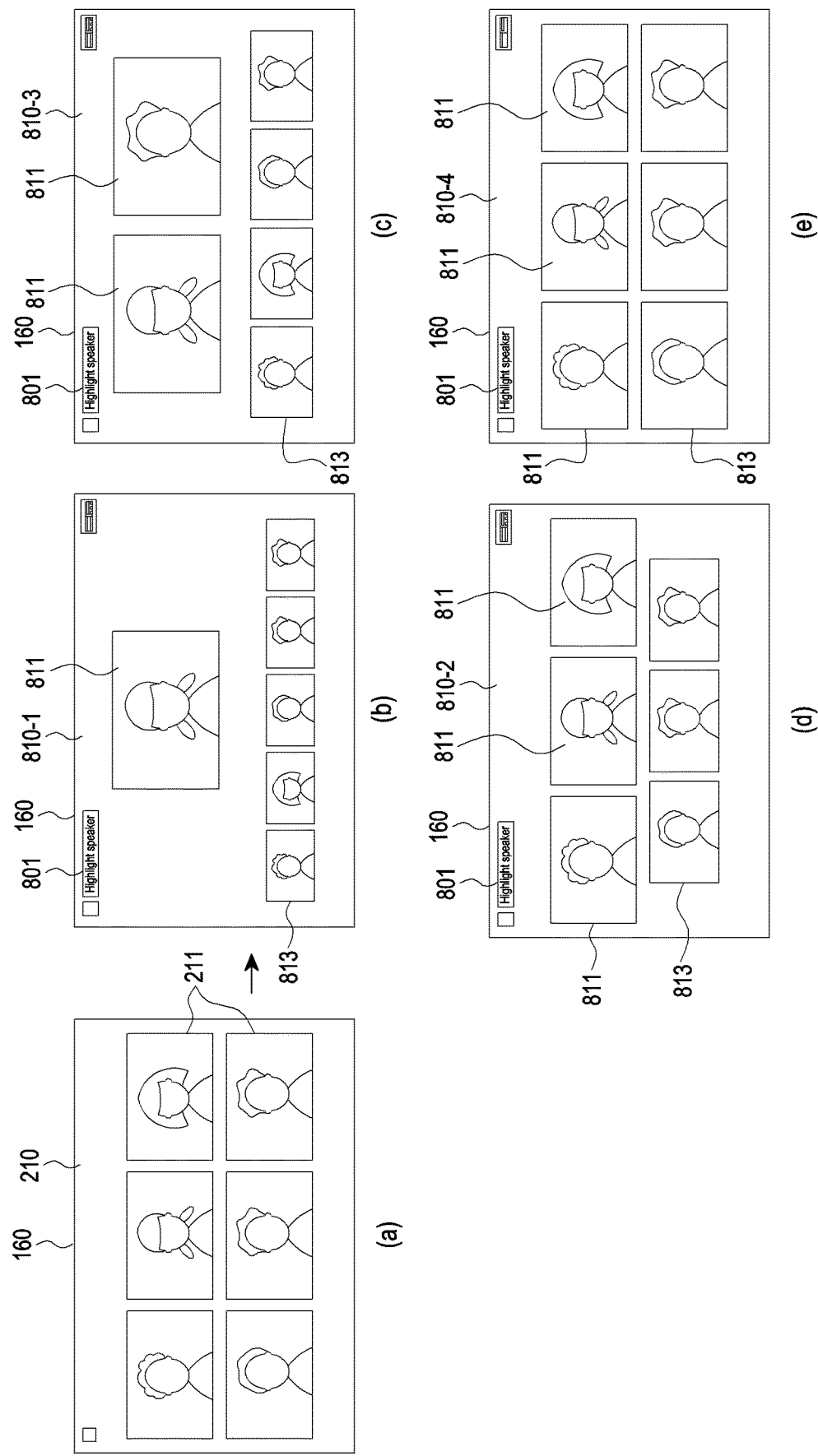
FIG. 8 is a diagram illustrating execution screens displayed on a display module in an electronic device according to an embodiment of the disclosure.

FIG. 8 is a diagram illustrating execution screens displayed on a display module in an electronic device according to an embodiment of the disclosure.

Referring to FIGS. 6, 7, and 8, the electronic device (e.g., the electronic device 101 of FIG. 1) according to an embodiment may display the first user interface (or execution screen) 210 on the display module 160 during a multi-party video call, as illustrated in part (a) of FIG. 6, part (a) of FIG. 7, and part (a) of FIG. 8. The electronic device may display the objects (graphical elements, still images, thumbnails, or videos) 211 representing a plurality of users participating in the multi-party video call on the first user interface 210. The electronic device may display the menu (object, button, function, graphical element, or image) 213 for activating or deactivating a function list indicating functions provided by an application related to the multi-party call. When receiving an input based on selection of the menu 213, the at least one processor 120 may display a function list including selectable function menus (objects, buttons, functions, graphical elements, or images) in a top area of the first user interface 210. The electronic device may control the display module 160 to display an additional menu for adding a function in an area adjacent to the function list on the first user interface 210. When the menu 213 is selected (tapped) again, the electronic device may control the menu 213 to disappear and control the display module 160 to display the first user interface 210 without the function list.

Referring to FIG. 6, according to an embodiment, the electronic device may identify users executing a specific function (hereinafter, described in the context of a whisper function 601 among the functions provided by the application, by way of example) among the plurality of users, and display the users executing the whisper function 601 on the first user interface 210, as illustrated in part (b) of FIG. 6. The electronic device may identify the users executing the whisper function 601 and configure a group (e.g., first group) 603 including objects representing the identified users and a group (e.g., second group) 605 including objects representing users not executing the whisper function 601. The electronic device may configure second user interfaces 610-1 and 610-2 applying different visual graphical effects to the configured groups. For example, the electronic device may configure the second user interface 610-1 by applying a different visual graphical effect to objects 611 representing the users included in the first group 603 from that of objects 613 representing users included in the second group 605, as illustrated in part (c) of FIG. 6. For example, the electronic device may provide different execution functions or different authorities (e.g., at least one of an authentication authority, an authority to control H/W components such as a microphone/camera, or a function-based S/W authority (e.g., chatting or voting)) to the different groups (e.g., the first group 603 and the second group 605). For example, when a user of the electronic device executes the whisper function, the second user interface 610-1 applying a different visual graphical effect to the first group 603 from that of the second group 605 may be displayed on the display module 160, as illustrated in part (c) of FIG. 6. To avoid revealing the content of the user's conversation when needed while performing the whisper function, the electronic device may not apply the different visual graphical effect different from that of the second group 605 on the second user interface 610-1, upon request of the user, and may configure the second user interface 610-1 to mute a microphone and display fake frames, as illustrated in part (c) of FIG. 6. In another example, when the user of the electronic device is included in the second group that does not execute the whisper function, the electronic device may display the configured second user interface 610-2 on the display module 160, as illustrated in part (d) of FIG. 6. The electronic device may configure the second user interface 610-2 to be displayed in a normal-mode layout so that the users of the second group are not aware of execution of the whisper function by the first group. For example, the electronic device may configure the first user interface 610-1 and the second user interface 610-2 such that character images selected by the individual users or automatically are displayed instead of still images or videos revealing the actual faces of the users.

Referring to FIG. 7, according to an embodiment, the electronic device may identify users executing a specific function (hereinafter, described as a group class function 701 among the functions provided by the application, by way of example) among the plurality of users, and group users executing the group class function 701 into a plurality of groups (e.g., a first group 703, a second group 705, and a third group 707), as illustrated in part (b) of FIG. 7. The electronic device may configure second user interfaces 710-1 and 710-2 applying different visual graphical effects to the configured groups. For example, when the user of the electronic device is a master (e.g., a lecturer or teacher) of remote learning, the electronic device may configure the second user interface 710-1 to display an object 711 representing the master and objects 713, 715, and 717 representing users grouped into the plurality of groups (e.g., the first group 703, the second group 705, and the third group 707), as illustrated in part (b) of FIG. 7. The electronic device may configure the same second user interface 710-2 (e.g., the same as the second user interface 710-2 in part (d) of FIG. 7) visible to other users (e.g., students) in response to a screen switching request from the user, as illustrated in part (c) of FIG. 7. In another example, when the user of the electronic device is a listener (e.g., a student) in the remote learning, the electronic device may configure the second user interface 710-2 to display the object 711 representing the master and the objects 713 representing users included in the group (e.g., the first group 703) to which the user belongs, as illustrated in part (d) of FIG. 7. The electronic device may configure the second user interface 710-2 such that only sounds from the members of the same group, not from the other groups are heard to allow only conversations between the users included in the first group 703, a function of calling up the master when needed is provided, and a memo board 721 for common writing in each group is provided. In another example, when the user of the electronic device is a listener (e.g., a student) in the remote learning, the electronic device may display the second user interface 710-2. Subsequently, when a group presentation function provided by the group class function is executed under the authority of the master, the electronic device may configure the second user interface 710-3 by applying a visual graphic effect (e.g., a larger image of the presenter) to an object 719 representing the presenter, which is different from that of the objects 711, 713, 715, and 717 of the other users, as illustrated in part (e) of FIG. 7. When executing a group presentation function, the electronic device may turn on the presenter's microphone to output sounds received from the presenter, while turning off or muting the microphones of the other users not to output sounds from the other users. For example, the electronic device may provide the user with the authority to control each group and select a presenter, when the user is a master.

Referring to FIG. 8, according to an embodiment, the electronic device may execute a specific function (hereinafter, described as a speaker highlighting function 801, by way of example) among the functions provided by the application, identify at least one user acting as a speaker who is speaking among the plurality of users, and configure second user interfaces 810-1, 810-2, 810-3, and 810-4 to display at least one object 811 representing the at least identified one user by enlarging it. For example, when the number of users who are at least one speaker is less than the number of listeners, the electronic device may configure the second user interfaces 810-1 and 810-3 to display the at least one object 811 representing the at least one speaker by enlarging the at least one object 811 to a specified first size, as illustrated in parts (b) and (c) of FIG. 8. The specified first size may vary depending on the number of speakers and the size of a display area. For example, when the number of users who are the at least one speaker is equal to the number of listeners, the electronic device may configure the second user interface 810-2 to display the at least one object 811 representing the at least one speaker by enlarging the at least one object 811 to a specified second size, as illustrated in part (d) of FIG. 8. The specified second size may vary depending on the number of speakers and the size of the display area. For example, when the number of users who are the at least one speaker is less than the number of listeners, the electronic device may configure the second user interface 810-4 to display the objects 811 representing the speakers and the objects 813 representing the listeners in the same size, as illustrated in part (e) of FIG. 8. The electronic device may be configured to display the objects 811 representing the speakers by applying a different visual graphic effect from that of the objects 813 representing the listeners.

Figure 9A:
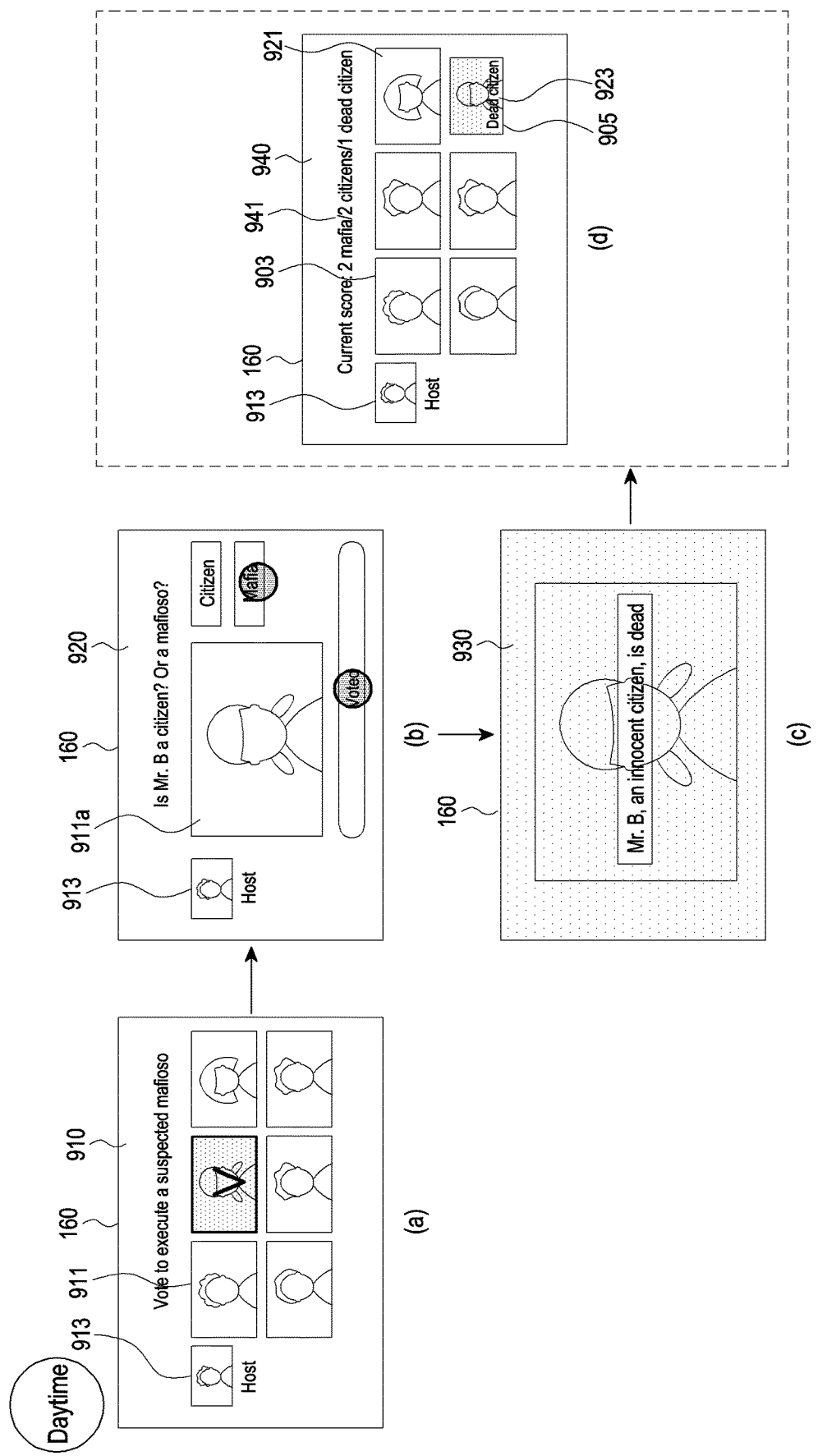
FIGS. 9A and 9B are diagrams illustrating execution screens displayed on a display module in an electronic device according to various embodiments of the disclosure.
Figure 9B:
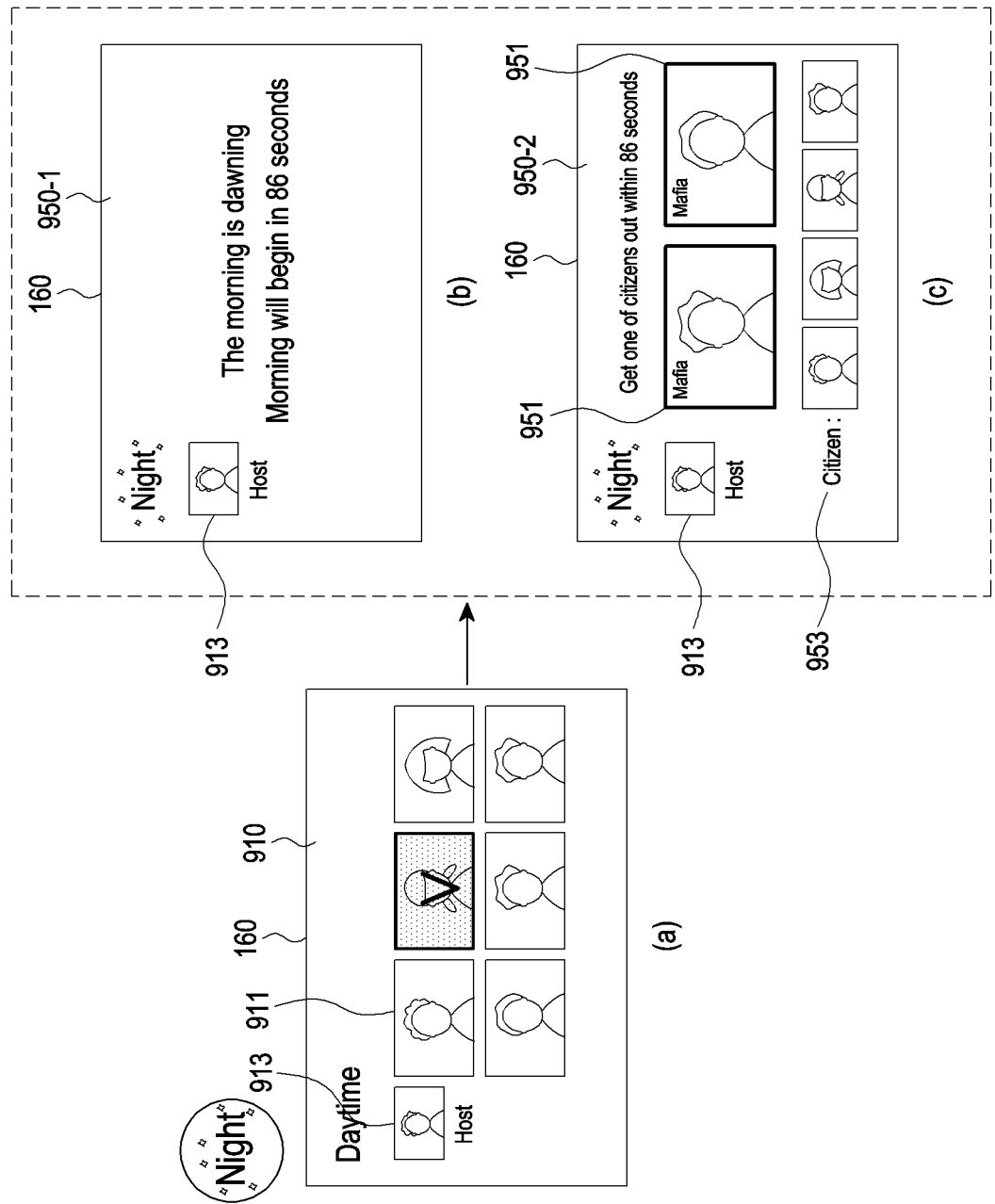

FIGS. 9A and 9B are diagrams illustrating execution screens displayed on a display module in an electronic device according to various embodiments of the disclosure.

Referring to FIG. 9A, the electronic device (e.g., electronic device 101 of FIG. 1) according to an embodiment may execute a specific function (hereinafter, referred to as a game function) among functions provided by an application in response to a user request. When a function of executing a specific mode (e.g., day mode) is executed during execution of a game function 901, the electronic device may display a predetermined user interface (not shown) (e.g., the first user interface 210 of FIG. 2) with objects representing a plurality of users in a video call on the display module 160. The electronic device may identify users executing the game function among the plurality of users, and configure a user interface 910 (e.g., the first user interface 210 of FIG. 2) to distinguishably display objects 911 representing users participating in the game among the identified users and an object 913 representing a host, as illustrated in part (a) of FIG. 9A. When a specific user is selected during the execution of the game function 901 (e.g., a mafia game), the electronic device may apply a different visual graphic effect to an object 911a representing the selected user distinguishably from the objects 911 representing other users. When a voting function is executed during the execution of the game function 901 (e.g., the mafia game), the electronic device may configure a user interface 920 for casting a vote and display the configured user interface 920 on the display module 160, as illustrated in part (b) of FIG. 9A. When voting is completed by the user on the user interface 920 for casting a vote, the electronic device may configure a user interface 930 to display a message or object indicating a voting result and display the configured user interface 930 on the display module 160, as illustrated in part (c) of FIG. 9A. As illustrated in part (d) of FIG. 9A, the electronic device may configure a user interface 940 (e.g., the second user interface 220 of FIG. 2) to group the users participating in the game function 901 into a first group 903 including users who were not selected and continue to participate in the game and a second group 905 including at least one selected user 923, based on voting result information, and display objects 921 representing the users included in the first group 903 and objects 915 representing the users included in the second group 905 with different visual graphical effects. The electronic device may be configured to display information 941 about the results of executing the voting function on the user interface 940. For example, the configured user interface 940 may be displayed equally on electronic devices of all users participating in the game function 901. In another example, the configured user interface 940 may be displayed differently on the electronic device of the user designated as a host or a mafia and the electronic devices of users designated as citizens.

Referring to FIG. 9B, when a function of another mode (e.g., night mode) is switched to during the execution of the game function, the electronic device according to an embodiment may configure a user interface 950-1 or 950-2 as illustrated in parts (b) and (c) of FIG. 9B, switching from the user interface 910 as illustrated in part (a) of FIG. 9B, and display the configured user interface 950-1 or 950-2 on the display module 160. The electronic device may configure the user interface 950-1 or 950-2 such that a group (e.g., a mafia group) 951 including some users (e.g., mafia) and a group (e.g., a citizen group) 953 including other users (e.g., citizens) are set separately among the users participating in the game function 901, and different visual graphical effects are applied to the set groups 951 and 953. For example, when the user of the electronic device is included in the group (e.g., mafia group) 951, the electronic device may display the user interface 950-2 visible to the users of the group 951 on the display module 160. In another example, when the user of the electronic device is included in the group (e.g., citizen group) 953, the electronic device may display a user interface (not shown) visible to the users of the group 953 on the display module 160. For example, a dialog may be transmitted/received between users included in the same group to allow for a conversation, without being transmitted to the users of the other groups to avoid exposure. After a period of time, the electronic device may switch to and display the user interface 920 as illustrated in part (b) of FIG. 9A under the authority of the host.

According to an embodiment, a method of operating an electronic device (e.g., the electronic device 101 of FIGS. 1 and 2) may include establishing communication connections with external electronic devices of a plurality of users by a communication module of the electronic device to execute a multi-party video call, displaying objects representing the plurality of users executing the multi-party video call on a display module (e.g., the display module 160 of FIG. 1) of the electronic device, using a specified first user interface, displaying one or selection items selectable in relation to a specific function on the first user interface in response to execution of the specific function during the execution of the multi-party video call, and displaying a second user interface on which the objects representing the plurality of users are changed and displayed based on identifying that a first selection item is selected from among the one or more selection items. The second user interface may be different from the first user interface and represented differently from a user interface displayed on an external electronic device of at least one second user who does not select the first selection item or selects another selection item.

According to an embodiment, the specific function may be included in a function list displayed on the first user interface, and may be a function of collecting an opinion or voting from each of the plurality of users.

According to an embodiment, displaying the second user interface on the display module may include setting a first group including an object representing the first user and an object representing at least one other third user selecting the first selection item among the plurality of users, setting a second group including an object representing the at least one second user who does not select the first selection item or selects another selection item, and displaying the second user interface on the display module by applying different visual graphical effects to the first group and the second group.

According to an embodiment, displaying the second user interface on the display module by applying the different visual graphical effects to the first group and the second group may include controlling the display module to display objects of the first user and the at least one other third user included in the first group as large-sized images on the second user interface, and displaying an object of the at least one second user included in the second group as a small-sized image on the second user interface.

According to an embodiment, the method may further include obtaining execution result information about the specific function based on information about a selection item selected by each of the plurality of users, displaying the execution result information on the second user interface, and transmitting the execution result information to external electronic devices.

According to an embodiment, the method may further include, when the first user is a master user proposing the specific function, providing at least one of an authentication authority, an authority to control a microphone or a camera of another user, a control authority related to execution of the specific function, or a user selection authority, and displaying the second user interface on the display module may include displaying the second user interface by applying a different visual graphical effect to an object representing at least some of the plurality of users according to the provided authority.

According to an embodiment, displaying the second user interface on the display module may include identifying at least one user corresponding to a speaker among the plurality of users during the execution of the multi-party video call, and configuring the second user interface to apply a visual graphic effect of highlighting an object representing the identified at least one user.

According to an embodiment, the method may further include displaying, on the first user interface, at least one of a menu for activating or deactivating a function list including functions provided by an application executing the multi-party video call or a menu for adding a function.

According to an embodiment, the method may further include displaying a specified character image in place of each of the objects representing the plurality of users on the second user interface to prevent actual faces of the plurality of users from being exposed.

According to an embodiment, a non-transitory computer-readable storage medium may store one or more programs including executable instructions which when executed by a processor of an electronic device, cause the electronic device to establish communication connections with external electronic devices of a plurality of users by a communication module of the electronic device to execute a multi-party video call, display objects representing the plurality of users executing the multi-party video call on a display module of the electronic device, using a specified first user interface, display one or more selection items selectable in relation to a specific function on the first user interface in response to execution of the specific function during the execution of the multi-party video call, and display a second user interface on which the objects representing the plurality of users are changed and displayed based on identifying that a first selection item is selected from among the one or more selection items. The second user interface may be different from the first user interface and represented differently from a user interface displayed on an external electronic device of at least one second user who does not select the first selection item or selects another selection item.

The embodiments disclosed herein are presented for the purpose of illustration and understanding of the disclosed subject matter, not intended to limit the technical scope of the disclosure. Accordingly, the scope of the disclosure should be construed as encompassing all modifications or various other embodiments based on the technical idea of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological functions set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
communication circuitry;
memory, comprising one or more storage media, storing instructions; and
one or more processors communicatively coupled to the display, the communication circuitry and the memory,
wherein the instructions, when executed by the one or more processors individually or collectively, cause the electronic device to:

establish communication connections with external electronic devices of a plurality of users by the communication circuitry to execute a multi-party video call, control the display to display objects representing the plurality of users executing the multi-party video call, using a first user interface, control the display to display one or more selection items selectable in relation to a specific function on the first user interface in response to execution of the specific function during the execution of the multi-party video call, control the display to display a second user interface on which the objects representing the plurality of users are changed and displayed based on identifying that a first selection item is selected from among the one or more selection items, and based on execution of the specific function having terminated, control the display to display to return to displaying the first user interface using the objects representing the plurality of users executing the multi-party video call, wherein the second user interface is different from the first user interface and is represented differently from a user interface displayed on an external electronic device of at least one second user who does not select the first selection item or selects another selection item, and wherein the second user interface includes an options menu for setting authority or functions available to the user.

2. The electronic device of claim 1, wherein the instructions, when executed by the one or more processors individually or collectively, further cause the electronic device to:

set a first group including an object representing a first user and an object representing at least one third user selecting the first selection item among the plurality of users, set a second group including an object representing the at least one second user who does not select the first selection item or selects another selection item, and control the display to display the second user interface by applying different visual graphical effects to the first group and the second group, wherein the different visual graphical effects include at least one of size adjustment, brightness adjustment, contrast adjustment, transparency adjustment, color display, gradation display, highlight display, or symbol display, wherein the specific function is included in a function list displayed on the first user interface, and wherein the specific function is a function of collecting an opinion or voting from each of the plurality of users.

3. The electronic device of claim 2, wherein the instructions, when executed by the one or more processors individually or collectively, further cause the electronic device to:

control the display to display an object of the first user and an object of the at least one third user included in the first group as large-sized images on the second user interface; and control the display to display an object of the at least one second user included in the second group as a small-sized image on the second user interface.

4. The electronic device of claim 1, wherein the instructions, when executed by the one or more processors individually or collectively, further cause the electronic device to:

when the first user is a master user proposing the specific function, provide at least one of an authentication authority, an authority to control a microphone or a camera of another user, a control authority related to execution of the specific function, or a user selection authority; and control the display to display an object representing at least some of the plurality of users on the second user interface by applying a different visual graphical effect to the object according to the provided at least one of the authentication authority, the authority to control the microphone or the camera of the other user, the control authority related to execution of the specific function, or the user selection authority.

5. The electronic device of claim 1, wherein the instructions, when executed by the one or more processors individually or collectively, further cause the electronic device to:

obtain execution result information about the specific function based on information about a selection item selected by each of the plurality of users;

control the display to display the execution result information on the second user interface; and control the communication circuitry to transmit the execution result information to external electronic devices.

6. The electronic device of claim 1, wherein the instructions, when executed by the one or more processors individually or collectively, further cause the electronic device to:

identify at least one user corresponding to a speaker among the plurality of users during the execution of the multi-party video call; and set the second user interface to apply a visual graphic effect of highlighting an object representing the identified at least one user.

7. The electronic device of claim 1, wherein the instructions, when executed by the one or more processors individually or collectively, further cause the electronic device to:

control the display to display, on the first user interface, at least one of a menu for activating or deactivating a function list including functions provided by an application executing the multi-party video call or a menu for adding a function; and control the display to display a specified character image in place of each of the objects representing the plurality of users on the second user interface to prevent actual faces of the plurality of users from being exposed.

8. A method of operating an electronic device, the method comprising:

establishing communication connections with external electronic devices of a plurality of users by communication circuitry of the electronic device to execute a multi-party video call;

displaying objects representing the plurality of users executing the multi-party video call on a display of the electronic device, using a specified first user interface;

displaying one or more selection items selectable in relation to a specific function on the first user interface in response to execution of the specific function during the execution of the multi-party video call;

displaying a second user interface on which the objects representing the plurality of users are changed and displayed based on identifying that a first selection item is selected from among the one or more selection items; and based on execution of the specific function having terminated, return to displaying the first user interface using the objects representing the plurality of users executing the multi-party video call, wherein the second user interface is different from the first user interface and is represented differently from a user interface displayed on an external electronic device of at least one second user who does not select the first selection item or selects another selection item, and wherein the second user interface includes an options menu for setting authority or functions available to the user.

9. The method of claim 8,
wherein the displaying of the second user interface on the display comprises:
setting a first group including an object representing a first user and an object representing at least one third user selecting the first selection item among the plurality of users,
setting a second group including an object representing the at least one second user who does not select the first selection item or selects another selection item, and
displaying the second user interface on the display by applying different visual graphical effects to the first group and the second group,
wherein the different visual graphical effects include at least one of size adjustment, brightness adjustment, contrast adjustment, transparency adjustment, color display, gradation display, highlight display, or symbol display,
wherein the specific function is included in a function list displayed on the first user interface, and
wherein the specific function is a function of collecting an opinion or voting from each of the plurality of users.

10. The method of claim 9, wherein the displaying of the second user interface on the display by applying the different visual graphical effects to the first group and the second group comprises:
controlling the display to display an object of the first user and an object of the at least one third user included in the first group as large-sized images on the second user interface; and
displaying an object of the at least one second user included in the second group as a small-sized image on the second user interface.

11. The method of claim 8, further comprising:
obtaining execution result information about the specific function based on information about a selection item selected by each of the plurality of users;
displaying the execution result information on the second user interface; and
transmitting the execution result information to external electronic devices.

12. The method of claim 8, further comprising:
when the first user is a master user proposing the specific function, providing at least one of an authentication authority, an authority to control a microphone or a camera of another user, a control authority related to execution of the specific function, or a user selection authority, wherein the displaying of the second user interface on the display comprises displaying the second user interface by applying a different visual graphical effect to an object representing at least some of the plurality of users according to the provided at least one of the authentication authority, the authority to control the microphone or the camera of the other user, the control authority related to execution of the specific function, or the user selection authority.

13. The method of claim 8, wherein the displaying of the second user interface on the display comprises:
identifying at least one user corresponding to a speaker among the plurality of users during the execution of the multi-party video call; and
configuring the second user interface to apply a visual graphic effect of highlighting an object representing the identified at least one user.

14. The method of claim 8, further comprising:
displaying, on the first user interface, at least one of a menu for activating or deactivating a function list including functions provided by an application executing the multi-party video call or a menu for adding a function; and
displaying a specified character image in place of each of the objects representing the plurality of users on the second user interface to prevent actual faces of the plurality of users from being exposed.

15. A non-transitory computer-readable storage medium storing one or more programs including executable instructions which when executed by one or more processors of an electronic device individually or collectively, cause the electronic device to:
establish communication connections with external electronic devices of a plurality of users by communication circuitry of the electronic device to execute a multi-party video call;
display objects representing the plurality of users executing the multi-party video call on a display of the electronic device, using a first user interface;
display one or more selection items selectable in relation to a specific function on the first user interface in response to execution of the specific function during the execution of the multi-party video call;
display a second user interface on which the objects representing the plurality of users are changed and displayed based on identifying that a first selection item is selected from among the one or more selection items; and
based on execution of the specific function having terminated, return to displaying the first user interface using the objects representing the plurality of users executing the multi-party video call,
wherein the second user interface is different from the first user interface and is represented differently from a user interface displayed on an external electronic device of at least one second user who does not select the first selection item or selects another selection item, and
wherein the second user interface includes an options menu for setting authority or functions available to the user.

* * * * *